United States Patent Office 3,287,421
Patented Nov. 22, 1966

3,287,421
DIHYDROXY POLYAROMATIC ETHER
Daniel W. Fox, Pittsfield, Mass., assignor to General
Electric Company, a corporation of New York
No Drawing. Original application July 19, 1956, Ser.
No. 598,768, now Patent No. 3,148,172, dated Sept. 8,
1964. Divided and this application Sept. 26, 1963, Ser.
No. 314,833
1 Claim. (Cl. 260—613)

This is a division of application Serial No. 598,768 filed July 19, 1956, now U.S. Patent 3,148,172.

This invention relates to aromatic carbonate resins, aromatic ethers useful in preparing said resins, and to methods of preparing said resins and ethers. More particularly, this invention relates to a carbonate resin characterized by alternating carbonate groups and ether-containing organic groups bonded to each other; each ether-containing organic group having at least two aromatic carbocyclic radicals bonded to each other by means of an ether linkage; each carbonate group being bonded directly to a nuclear carbon of one aromatic radical of each ether-containing organic group. Still more particularly, this invention relates to a linear polymer characterized by recurring structural units of the formula (I)

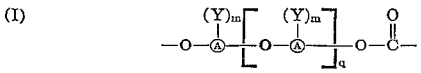

where A is the residue of an aromatic nucleus; Y is an organic or an inorganic radical, for example, monovalent hydrocarbon, halogenated monovalent hydrocarbon, organoxy such as alkoxy, etc., halogen, nitro, etc.; $m$ is a whole number equal to from 0 to a maximum determined by the number of replaceable nuclear hydrogens substituted on the aromatic hydrocarbon residue A; and $q$ is a whole number equal to at least 1.

Many carbonate resins are known. Among these carbonate resins are those prepared by the vinyl polymerization of unsaturated carbonate esters such as alkyl carbonates, etc., those resins prepared from the ester interchange of carbonate esters with aliphatic glycols and those resins prepared by reacting dihydroxy monoaryl compounds, such as hydroquinone and resorcinol, with carbonate precursors, such as phosgene or carbonate esters. Although these known carbonates have found some uses as modifiers, plasticizers, hydraulic fluids, etc., they have never achieved industrial importance as individual thermoplastic entities because of their poor properties, for example, they are too low melting, too insoluble, too unstable, etc.

I have now discovered that carbonate resins within the scope of Formula I can be readily prepared and have excellent physical, chemical, electrical, thermal, etc. properties.

In general, the carbonate resins of this invention can be prepared by reacting a dihydroxyaromatic ether with any suitable carbonate precursor. The dihydroxy aromatic ether is characterized by two terminal hydroxy groups bonded to an ether-containing organic group, said ether-containing organic group having at least two aromatic carbocyclic radicals bonded to each other by means of an ether linkage, and said terminal hydroxy groups being bonded directly to a nuclear carbon of the first and last aromatic radicals. Where the dihydroxy-aromatic ether has at least three aromatic carbocyclic radicals bonded to each other by means of an ether linkage, the compound is called a "dihydroxy polyaromatic ether."

One method of preparing these resins comprises effecting reaction between (1) a dihydroxy aromatic ether, for example of the formula (II)

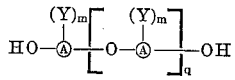

also referred to as a "dihydroxyether" and (2) a diaryl carbonate, for example of the formula (III)

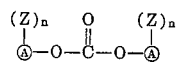

where A is the residue of an aromatic nucleus; Y and Z are inorganic or organic radicals, said radicals being inert to and unaffected by the reactants and by the reaction of the dihydroxyether and the diaryl carbonate; $m$ and $n$ are whole numbers equal to from 0 to a maximum equivalent to the number of replaceable nuclear hydrogens substituted on the aromatic hydrocarbon residue A; and $q$ is a whole number equal to at least one.

In the above formula for the dihydroxyether, the inert substituents designated by Y on each aromatic hydrocarbon residue may be the same or different; the number of Y's on each respective aromatic hydrocarbon nucleus residue A may also be varied if desired so that a symmetrical or an unsymmetrical compound be formed. The Z's in the diaryl carbonate defined by Formula III may also be the same or different, and the number of substituents represented by Z may be the same on each aromatic nucleus A, or may vary depending upon the degree of substitution desired on each aromatic residue A.

Among the inert substituents which Y and Z may represent are, for instance, halogens (e.g., chlorine, bromine, fluorine, etc.); organoxy radicals of the formula OR, where R is a monovalent hydrocarbon radical; and monovalent hydrocarbon radicals of the type represented by R. Other inert substituents included within the scope of Y and Z, such as the nitro group, may be substituted on the aromatic nuclear residue A without departing from the scope of the invention.

Among the monovalent hydrocarbon radicals which R may represent are, for instance, alkyl radicals (e.g. methyl, ethyl, propyl, isopropyl, butyl, decyl, etc.), aryl radicals (e.g., phenyl, naphthyl, biphenyl, tolyl, xylyl, ethylphenyl, etc.), aralkyl radicals (e.g. benzyl, phenylethyl, etc.), cycloaliphatic radicals (e.g., cyclopentyl, cyclohexyl, etc), as well as monovalent hydrocarbon radicals containing inert substituents thereon, for instance, halogens (e.g., chlorine, bromine, fluorine, etc.). Among the aromatic nuclei which A may represent are, for instance, the aromatic hydrocarbon residues based on benzene, biphenyl, naphthalene, anthracene, etc. The final configuration of this aromatic hydrocarbon residue in the molecule is determined by the nuclearly-substituted hydroxyl groups, together with any nuclearly-substituted hydrogen atoms and the number of inert substituents represented by either Y or Z.

In the above formulae, $m$ and $n$ may be zero whereby the aromatic nuclear residues A will be unsubstituted except for the hydroxyl groups in regard to Formula II, or else there may be a plurality of substitutions of inert substituents on the aromatic nuclear residues depending upon the number of nuclearly bonded hydrogens remaining on A, taking into consideration the presence of the hydroxyl groups in Formula II. Where $q$ is equal to one, the compound of Formula II is a monoether. When $q$ is greater than one, this compound is a polyether.

The positions of the hydroxyl groups Y and Z on the aromatic nuclear residue A, may be varied in the ortho, meta or para positions, and the groupings may be in a vicinal, asymmetrical, or symmetrical relationship, where two or more of the nuclearly-bonded hydrogens of the aromatic hydrocarbon residue are substituted with, for instance Y, and the hydroxyl group in Formula II.

In general, the aromatic carbonate resins of the instant invention can be prepared by interaction between the reactants at elevated temperatures of from about 150° C. to 300° C. or higher for times varying from about 1 to 15 or more hours under such conditions that an ester interchange occurs whereby, concurrently with the heating, there is removed from the reaction mixture a composition having the formula (IV) 

where A, Z and $n$ have the meanings given above. This ester interchange evolution of the hydroxyaryl compound (represented by Formula IV) is advantageously carried out at sub-atmospheric pressure, for instance, at reduced pressures of around 0.01 to 5 to 10 mm. of mercury, preferably while blanketing the reaction mixture with a non-oxidizing or an inert atmosphere, such as hydrogen or nitrogen, neon, krypton, etc., to prevent undesirable oxidative effects especially under such conditions where extremely high reaction temperatures are employed under moderate sub-atmospheric pressures. The use of atmospheric and superatmospheric pressures is, however, not precluded. Heating under vacuum after the ester exchange is substantially completed (hereafter called "vacuum cooking"), for example at from 150–300° C. at 0.01 to 5–10 mm. for extended periods of time, tends to increase the molecular weight and viscosity of the carbonate resin.

Although the reaction can be carried out in the absence of a catalyst, one may, if desired, use the usual ester exchange catalysts, for instance, metallic lithium, potassium, calcium, beryllium, magnesium, zinc, cadmium, aluminum, chromium, molybdenum, iron, cobalt, nickel, chromium, silver, gold, tin, antimony, lead, barium, strontium, platinum, palladium, etc., compounds thereof, such as alcoholates, oxides, carbonates, acetates, hydrides, etc. Additional catalysts and variations in the ester interchange methods are discussed in Groggins, "Unit Processes in Organic Synthesis" (4th Ed., McGraw-Hill Book Co., 1952), pages 616–620. The amount of such catalyst is usually quite small and is of the order of 0.001 to 0.1%, or more, by weight, based on the total weight of the reactants.

Although equimolar ratios of the diaryl carbonate and the dihydroxyether or excesses of either reactant can be used to make the resinous compositions of the instant invention, an excess (based on molecular equivalents, hereafter called "molar excess") of the diaryl carbonate is preferred since products of higher molecular weights and viscosities can be more easily obtained with excess diaryl carbonates. Thus, I have employed the diaryl carbonate and the dihydroxyether in essentially molar equivalents or in molar concentrations which are almost equal using for each mole of the dihydroxyether from about 0.98 to about 1.02 moles of the diaryl carbonate, or larger molar excesses of the diaryl carbonate, for instance, by employing, for each mole of the dihydroxyether, from about 1.05 to 2.0 moles or more of the diaryl carbonate. Molar excesses of the dihydroxyether can also be employed, particularly when the dihydroxyether is more volatile than the diaryl carbonate.

Although I prefer to carry out the ester interchange with diaryl carbonates, other carbonate esters can also be employed. These other carbonate esters comprise dialkyl esters (wherein the alkyl radicals are for example, methyl, ethyl, propyl, butyl, hexyl, heptyl, octyl, decyl, octadecyl, etc.) dicycloalkyl esters comprising for example, cyclopentyl, cyclohexyl, cycloheptyl, etc., and the like.

The carbonate resins can also be prepared by introducing phosgene into solutions of dihydroxyethers in organic solvents, for example organic bases, such as tertiary amines (e.g. pyridine, dimethylaniline, quinoline, etc.). The organic bases can be undiluted or diluted with inert solvent, for example hydrocarbons, such as benzene, toluene, xylene, etc., halocarbons, such as chloroform, etc. The advantage of tertiary amines is that they are unreactive, are good solvents and act as acid acceptors for HCl given off during the reaction. Although the phosgene reaction can be carried out over a wide temperature range, such as below 0° C. to 100° C. or higher, the reaction proceeds satisfactorily at 25° C. to 50° C. Since the reaction is exothermic, the rate of phosgene addition can be used to control the temperature of the reaction. I have found that the ratio of phosgene to dihydroxyether can be varied over wide limits. Substantially equimolar amounts can be used, although an excess of from 1.05–1.5 moles or more of phosgene is preferred. The concentration of dihydroxyether in solvent can also be varied within wide limits although for ease of reaction and handling I prefer to use a solution containing from 5 to 50% by weight of dihydroxyether.

In general the phosgene reaction is carried out by dissolving dihydroxyether in an organic base, such as pyridine. The system is then flushed with nitrogen and the temperature of the reaction mixture is adjusted by heating or cooling, if desired, and phosgene is passed into the mixture at the desired rate. After the reaction is completed, the polymer is precipitated by any suitable means; for example, by pouring the reaction product into a well-stirred liquid capable of effecting precipitation, for example, hydrocarbons, alcohols, etc. Anhydrous precipitants are preferred but water may also be used. After filtration the precipitate is washed with methanol or other solvent capable of removing pyridine and pyridine hydrochloride to yield upon drying a finely divided fibrous product.

Another method of preparing aromatic carbonate resins comprises reacting phosgene with aqueous solutions of soluble salts (for example, sodium, potassium, etc. salts) of the dihydroxyether whereby carbonate resin separates generally as a fibrous curd from aqueous solution due to its insolubility. Where low molecular weights are produced by this aqueous process, the product can be neutralized, washed with water and further reacted with diaryl carbonate to a higher molecular weight. A product of higher molecular weight can be obtained from the aqueous process without treatment with diaryl carbonate by adding solvents to the water or by forming aqueous organic emulsions which effect greater solubility of the phosgene and keep the carbonate resin in solution until a higher molecular weight is obtained. The product so formed is washed with acid, such as hydrochloric acid to neutralize the product. The product produced in this manner can be used as a molding powder, or dissolved in solvents to produce mixtures useful as surface coatings.

As a result of these reactions there is obtained a linear polymer comprising structural units of the formula (V) 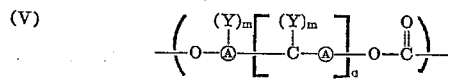

where A, Y, $m$, and $q$ have the meanings given above. During the course of the reaction $x$ is a whole number equal to at least 1 and may grow to as high as 500 or more. These products are useful thermoplastic resinous materials which have good thermal resistance, high heat distortion temperature, extremely high mechanical strength, and excellent electrical characteristics, etc.

Some of the dihydroxyethers useful in preparing carbonate resins are known while others are disclosed herein for the first time. An excellent summary of methods of preparing dihydroxyethers is found in "Chemical Reviews" 38, 414–417 (1946).

One method of preparing dihydroxyether is the Ullman reaction wherein a halogenated phenol such as p-bromoanisole is reacted with a metallic phenoxide such as potassium p-methoxyphenoxide in the presence of copper powder. To be assured of terminal hydroxy groups on the dihydroxyether it is advantageous to have at least one phenol group on each phenolic compound etherified prior to reaction. Upon completion of the reaction these terminal etherified groups are removed by any suitable means such as by treatment with a hydrogen halide, for example HI, HBr, etc.; treatment with a solvent containing aluminum halide, such as AlCl$_3$, AlBr$_3$, etc. Acetic anhydride or other acid anhydrides can be added to the aqueous halogen acids to effectively remove some of the water, raise the boiling points, improve solubility, etc. Since methyl ethers give high yields and since they can be readily demethylated, they are generally used. Etherification is affected by such common etherifying agents as dimethylsulfate, etc.

Of course, other methods of preparing dihydroxyethers can also be employed, for instance, the method disclosed in U.S. Patent 2,739,171, Linn, wherein dihydroxyaromatic compounds, such as hydroquinone, resorcinol, catechol, dihydroxynaphthalene, etc. are dehydrated with suitable agents to dihydroxy ethers; the hydrolysis of dihaloaromatic compounds, etc.

By modifying the above Ullman-type reaction, dihydroxypolyphenylethers can be prepared. Thus, by substituting a dihalo aromatic compound, such as dihalobenzene, dihalodiphenylether, dihalodiphenyl, etc. for the alkoxy halo aromatic compound, such as bromoanisole, there is obtained dimethylethers of the corresponding dihydroxypolyaromatic ethers. These methylated compounds can be demethylated to the corresponding dihydroxyether. By varying the ratio of dihaloaromatic compounds to alkoxyphenate and by repeating the reaction with the intermediates formed in a prior step, there is obtained dihydroxy polyethers of varying molecular weights.

These dihydroxy polyaromatic ethers are shown in Formula II wherein $q$ is a whole number having a value of from 2 to 10 or higher.

In order that those skilled in the art may better understand how the present invention may be practiced, the following examples are given by way of illustration and not by way of limitation. All parts are by weight unless otherwise stated.

*Example 1*

The example illustrates the preparation of p,p'-dimethoxydiphenylether. One mole of p-bromoanisole, two moles of p-methoxyphenol, 1 mole of potassium hydroxide and 10 grams of copper powder are placed in a reactor equipped with a stirrer, a thermometer and a reflux condenser fitted with a trap which allows the removal of water. The reactor is heated to 240° C. over one hour, vigorous stirring being accomplished by using a ball of copper wool as a stirring blade. During the first hour most of the water formed from the reaction of p-methoxyphenol and potassium hydroxide is removed by distillation. The reaction is then continued for about 4 more hours at 240° C.

After the reaction is completed, the reaction mass is cooled to about 200° C and poured into a 5% aqueous solution of KOH. The organic residue comprising p,p'-dimethoxydiphenylether is washed repeatedly and alternately with 5% aqueous KOH and water. The crude product is dried, then distilled and the fraction boiling at 340° C. (atmospheric pressure) is collected.

The distilled product, p,p'-dimethoxydiphenylether, has a melting point of 103° C.

*Example 2*

This example illustrates the preparation of p,p'-dihydroxydiphenylether. The demethylation of p,p'-dimethoxydiphenylether is accomplished by refluxing for eight hours 50 grams of the product prepared in Example 1 in a mixture of 250 grams of acetic anhydride and 250 grams of 48% hydrobromic acid. The demethylated mixture was then added to about 2 liters of ice and water causing precipitation of the product. This precipitate is collected, dissolved in 5% aqueous KOH, filtered and reprecipitated by neutralizing with concentrated hydrochloric acid. The crude precipitate is then purified by first dissolving in a minimum of acetone and then precipitating by adding the acetone solution to boiling toluene. The product, p,p'-dihydroxydiphenylether, has a melting point of 164.5° C.

*Example 3*

This example illustrates the preparation of p,p'-dimethoxytriphenylether (VI)

The reaction is carried out in the manner of Example 1 except that p-dibromobenzene is used in place of p-bromoanisole. The ingredients employed in the reaction are 3 moles of p-methoxyphenol, 1 mole of p-dibromobenzene and 2 moles of KOH. As in Example 1 the total reaction time is 5 hours.

The product is purified by cooling to about 200° C., and pouring into a 5% aqueous solution of KOH and repeatedly and alternately washing with 5% aqueous KOH and water. The crude product resulting from this treatment is further purified by dissolving in chlorobenzene and passing the solution through a column of Magnesol (magnesium silicate). p,p'-Dimethoxytriphenylether is precipitated by pouring the chlorobenzene solution into petroleum ether to yield a product having a melting point of 144–145° C.

*Example 4*

This example illustrates the preparation of p,p'-dihydroxytriphenylether (VII)

Attempts to demethylate p,p'-dimethoxytriphenylether by the method described in Example 2 or by HI-HBr mixture are unsuccessful without the use of pressure, probably due to low solubility of the triphenylether. However, the following procedure is satisfactory.

p,p'-Dimethoxytriphenylether (25 grams), 75 grams of anhydrous aluminum chloride and 300 ml. of benzene are placed in a reactor equipped with a reflux condenser and refluxed for two hours. The product is isolated by adding water, steam distilling off benzene and filtering. The crude product is dissolved in 5% aqueous KOH and filtered. The desired compound in the filtrate is precipitated by neutralizing with hydrochloric acid. This precipitate is filtered, dried and purified by several recrystallizations from benzene, ethyl acetate and petroleum ether. The product, p,p'-dihydroxytriphenylether, has a melting point of 195–196° C.

*Example 5*

This example illustrates the preparation of bis-(p-methoxyphenylether)-4,4'-biphenyl, (VIII)

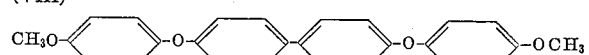

which is prepared by the method of Example 3 except that p,p'-dibromobiphenyl is substituted for p,p'-dibromobenzene. The product is decolorized by dissolving in hot chlorobenzene and filtering through a Magnesol column. The purified product (Formula VIII) which separated on cooling has a melting point of 210–212° C.

*Example 6*

This example illustrates the preparation of bis-(p-hydroxyphenlyether)-4,4'-biphenyl which is prepared by demethylating the product of Example 5 by the process described in Example 4. The demethylated product is dissolved in 5% KOH, filtered, and reprecipitated by neutralizing with hydrochloric acid. The precipitate, filtered, dried, and purified by several recrystallizations from ethyl acetate and petroleum ether, has a melting point of 241–243° C. and is the demethylated product of the compound of Formula VIII.

*Example 7*

This example illustrates the preparation by the ester interchange method of a resin having recurring units of the formula (IX) 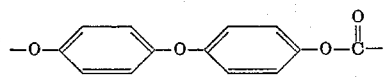

p,p'-Dihydroxydiphenylether (1 mole) and diphenyl carbonate (2 moles)

(X) 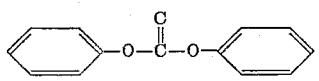

are charged to a reactor. Nitrogen is slowly allowed to enter beneath the surface of the reactants for both agitation and blanketing. This mixture is heated under atmospheric pressure over a 6 hour period during which time the temperature rises to 300° C. During this period phenol distills off and as the temperature rises above 275°–300° C. excess diphenyl carbonate is distilled over. When the ester interchange is substantially complete, the product is vacuum cooked for 6 additional hours at 300° C. at 5–10 mm. pressure followed by 4 hours additional heating to 375° C. under the same pressure. A near quantitative yield is obtained. A cold rod is inserted in the hot melt and a fiber pulled out. It is tough and is very readily cold drawn.

This product (Formula IX), which is a crystalline material, is pressed into 15 mil sheets. It has a dielectric strength at 27° C. (short time, about 40 seconds, breakdown) of 30 kilovolts or 2000 volts/mil, and a tensile strength of 6000 p.s.i.

This product can also be cast into film from dioxane solution. The crystalline film becomes amorphous at 225–235° C.

*Example 8*

This example illustrates the preparation by ester interchange of a resin having recurring units of the formula (XI) 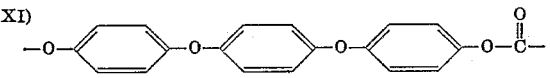

i.e. poly(triphenylether carbonate). p-Dihydroxytriphenyl ether (one mole prepared in Examples 3 and 4) and diphenyl carbonate (two moles) are treated in the manner of Example 7. The vacuum cooking schedule of this reaction is 4 hours at 300° C. at 5–10 m., and 7.5 hours at 375° C. The product (Formula XI) is soluble in hot dioxane and can be cast into strong films.

*Example 9*

This example illustrates the preparation of a resin having the repeating units shown in Formula IX by the phosgene-pyridine method.

One part of p,p'-dihydroxydiphenylether is dissolved in 10 parts of anhydrous pyridine contained in a reactor equipped with a stirrer, a thermometer, and a gas inlet and outlet tube. After the flash is flushed with nitrogen, phosgene gas is admitted below the surface of the solution at such a rate that the temperature of the reaction is kept below 30° C. without external cooling. After about 25 minutes there is a very pronounced increase in viscosity. During this period, slightly more than an equimolar ratio of phosgene is added (about a 10% excess of phosgene based on p,p'-dihydroxydiphenylether). The polymer is then precipitated by pouring the reaction mixture into well-agitated n-hexane. The polymer slurry is filtered, poured again into to well-agitated n-hexane and washed with well-agitated anhydrous methanol. The resulting polymer (Formula IX) after being dried overnight at 80° C. is white, and can be cold drawn from a melt.

*Example 10*

This example illustrates the preparation of a resin having the repeating units shown in Formula XI by the phosgene-pyridine method.

One part of p,p'-dihydroxytriphenylether is dissolved in 20 parts of anhydrous pyridine and reacted and purified in the manner of Example 8. The purified polymer (Formula XI) is similar in appearance to that obtained from p,p'-dihydroxydiphenylether.

*Example 11*

This example illustrates the preparation of a resin having recurring units of the formula (XII) 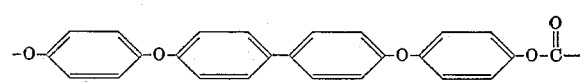

by the phosgene-pyridine method.

One part of bis-(p-hydroxyphenylether)-4,4'-biphenyl (prepared by the method of Examples 5 and 6) was dissolved in 20 parts of anhydrous pyridine, and reacted with phosgene and purified in the manner of Example 8. The purified product (Formula XII) melts at 250° C. and could be cold drawn from a melt.

Alkyl dihydroxydiphenylethers are prepared by reacting alkyl alkoxyphenyl halides with alkyl alkoxy phenoxides according to the following equation:

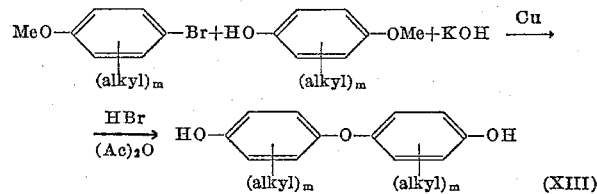

(XIII)

*Example 12*

One mole of o-methyl-p-bromoanisole, 2 moles of o-methyl-p-methoxy phenol, 1 mole of KOH, and 10 grams of copper powder are reacted and demethylated according to the methods of Examples 1 and 2 to produce (XIV) 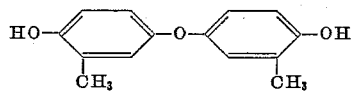

One mole of this compound is then reacted with 2.0 moles of diphenyl carbonate according to the method of Example 7 to prepare a carbonate resin having recurring units of the formula (XV) 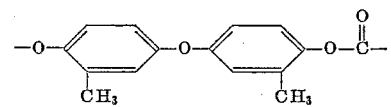

This product can also be prepared by the phosgene-pyridine method of Example 8.

The presence of ortho groups (relative to the hydroxy group) on the dihydroxyether moiety of the carbonate resin imparts high alkaline stability to the final product. For example, a molded piece of the above product can be boiled with aqueous alkaline for long periods of time without degradation. These ortho substituted resins also exhibit high hydrolytic stability, for example, a portion of this same resin is sealed in a tube with water and heated at 130° C. for several days with no apparent degradation.

Halogen derivatives are prepared by halogenating dimethoxy diphenylethers according to the method described in Lions et al., J. Proc. Roy. Soc., N.S. Wales 72, 257 (1939).

*Example 13*

One mole of p,p'-dimethoxydiphenylether is halogenated according to Lions' method to yield a mixture of chlorinated products. This product is demethylated according to the process of Example 2 to yield (XVI)
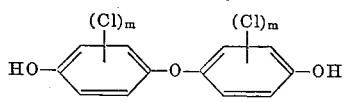

One mole of this compound is then reacted with 2.0 moles of diphenyl carbonate according to the method of Example 7 to prepare a carbonate resin having recurring units of the formula

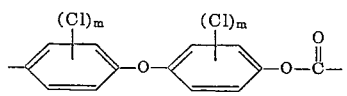

In addition to the specific reactants described above in the ester interchange method, other diaryl carbonates and dihydroxyethers can be employed. Examples of other carbonate esters comprise symmetrical carbonates, for example di-(halophenyl) carbonates e.g. di-(chlorophenyl) carbonate, di-(bromophenyl) carbonate; di-(polyhalophenyl) carbonates e.g. di-(trichlorophenyl) carbonate, di-(tribromophenyl) carbonate, etc.; di-(alkylphenyl) carbonates e.g. di-(tolyl) carbonate, etc., di-(naphthyl) carbonate, di-(chloronaphthyl) carbonate, etc.; unsymmetrical carbonates, for example, phenyl tolyl carbonate, chlorophenyl chloronaphthyl carbonate, trichlorophenyl chlorotolyl carbonate, etc. Mixtures of the foregoing carbonate esters can also be employed.

These diaryl carbonates can be prepared by the methods described in A. F. Holliman et al., Rec. Trav. Chem. 36, 271 (1916), and Copisarow, J. Chem. Soc. (Brit.), 1929, 251, both of whom discloses preparing dicresyl carbonate by treating the alkali metal salts of p-cresol with phosgene, and U.S. Patent 2,362,865—Tryon et al. which discloses preparing diphenyl, ditolyl, and dinaphthyl carbonates by passing phosgene through a column of the phenol in the presence of a catalyst, etc.

Examples of other dihydroxy ethers comprise the 4,3'-, 4,2'-, 4,1'-, 2,2'-, 2,3'-, etc. dihydroxy diphenyl ethers;

4,4'-dihydroxy-2,6-dimethyl-diphenylether;
4,4'-dihydroxy-2,5-dimethyl-diphenyl ether;
4,4'-dihydroxy-3,3'-di-isobutyl-diphenyl ether;
4,4'-dihydroxy-3,3'-diphenyl ether;
4,4'-dihydroxy-3,3'-diisopropyl diphenyl ether;
4,4'-dihydroxy-3,2'-dinitro-diphenyl ether;
4,4'-dihydroxy-3,3'-dichloro-diphenyl ether;
4,4'-dihydroxy-3,3'-difluoro diphenyl ether;
4,4'-dihydroxy-2,3'-dibromo diphenyl ether;
4,4'-dihydroxy dinaphthyl ether;
4,4'-dihydroxy-3,3'-dichlorodinaphthyl ether;
2,4-dihydroxy-tetraphenyl ether;
4,4'-dihydroxy-pentaphenyl ether;
4,4'-dihydroxy-2,6-dimethoxy-diphenyl ether;
4,4'-dihydroxy-2,5-diethoxydiphenyl ether, etc.

Mixtures of these dihydroxyethers can also be employed.

Because of their excellent physical, mechanical, chemical, electrical and thermal properties the products of this invention have many and varied uses. For example, they can be used in molding powder formulations, either alone, or by mixing them with various fillers such as wood flour, diatomaceous earth, carbon black, silica, etc. to make molded parts such as spur, helical, worm or bevel gears, ratchets, bearings, cams, impact parts, gaskets, valve seats for high pressure oil and gas systems or other chemical fluids requiring resistance to chemicals, etc.

Films of these products prepared by calendering or extrusion (either orientated or not) are useful as metal or fiber liners, containers, covers, closures, electrical insulating tapes, in sound recording tapes, pipe coverings, etc. Because of their chemical inertness, tubing of these materials can be used to transport chemicals, such as acids and bases, which might be deleterious to other resins. Because of their chemical, physical and thermal properties, they may be used as surface coating for such apparatus as refrigerators, washing machines, cooking ovens, etc. Additional uses are as rods, wire coating, wire enamels, slot insulations in dynamoelectric machines, fibers, etc. These resins can also be employed in varnish and paint formulations and as bonding material for metallic or fibrous laminates. The carbonate resins of the present invention may be mixed with various fillers, modifying agents, etc. such as dyes, pigments, stabilizers, plasticizers, etc.

Copolymers of dihydroxyethers are also included within the scope of this invention, e.g. carbonate resins wherein a plurality of dihydroxyether moieties are contained within the same carbonate resin, such as the product formed from the simultaneous reaction of mixtures of a plurality of dihydroxyethers with a diaryl carbonate or phosgene, etc.; for example, the carbonate resins formed by reacting a mixture of unsubstituted dihydroxyether or corresponding polyethers and alkyl dihydroxyether or corresponding polyethers with diphenyl carbonate or phosgene or the carbonate resins formed by reacting mixtures of other dihydroxyethers.

The foregoing detailed description has been given for clearness of understanding only and no unnecessary limitations are to be understood therefrom. The invention is not limited to the exact details shown and described for obvious modifications will occur to those skilled in the art.

What I claim as new and desire to secure by Letters Patent of the United States is:

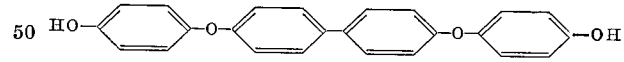

References Cited by the Examiner
UNITED STATES PATENTS
2,739,171   3/1956   Linn _____ 260—613

LEON ZITVER, *Primary Examiner.*

B. HELFIN, *Assistant Examiner.*